(12) United States Patent
Baruch

(10) Patent No.: US 10,036,563 B2
(45) Date of Patent: Jul. 31, 2018

(54) PORTABLE CONFINED SPACE VENTILATOR

(71) Applicant: Joseph Baruch, Stuart, FL (US)

(72) Inventor: Joseph Baruch, Stuart, FL (US)

( * ) Notice: Subject to any disclaimer, the term of this patent is extended or adjusted under 35 U.S.C. 154(b) by 383 days.

(21) Appl. No.: 14/217,419

(22) Filed: Mar. 17, 2014

(65) Prior Publication Data

US 2015/0260422 A1 Sep. 17, 2015
US 2017/0023266 A9 Jan. 26, 2017

Related U.S. Application Data

(60) Provisional application No. 61/799,387, filed on Mar. 15, 2013.

(51) Int. Cl.

| | |
|---|---|
| *F24F 1/02* | (2011.01) |
| *F24F 5/00* | (2006.01) |
| *F24F 7/007* | (2006.01) |
| *B64F 1/36* | (2017.01) |
| *F24F 7/00* | (2006.01) |

(52) U.S. Cl.
CPC ............ *F24F 5/0035* (2013.01); *B64F 1/362* (2013.01); *F24F 1/025* (2013.01); *F24F 7/007* (2013.01); *F24F 2007/003* (2013.01)

(58) Field of Classification Search
CPC ... F24F 1/025; F24F 1/04; F24F 7/007; B64F 1/362
See application file for complete search history.

(56) References Cited

U.S. PATENT DOCUMENTS

| | | | | |
|---|---|---|---|---|
| 5,048,304 | A * | 9/1991 | Takeuchi | ............... F24F 1/025 62/183 |
| 5,117,652 | A * | 6/1992 | Takeuchi | ............... F24F 1/025 62/291 |
| 6,405,549 | B1 * | 6/2002 | Baffes | ..................... F24F 1/025 62/188 |
| 2005/0211415 | A1 * | 9/2005 | Arts | ......................... A61L 9/16 165/59 |

* cited by examiner

*Primary Examiner* — Cassey D Bauer
(74) *Attorney, Agent, or Firm* — Shutts & Bowen LLP

(57) ABSTRACT

The present invention relates to a modular air conditioning unit, comprising a chassis having an outside surface, comprising an evaporator coil air intake opening; a treated air discharge opening; and a condenser coil air intake opening; and an air conditioning system located within the chassis, comprising a condenser coil unit, an evaporator coil unit, and a blower, including an air intake opening, and an air discharge opening in fluid communication with the treated air discharge opening, wherein the air intake opening is in fluid communication with the evaporator coils.

20 Claims, 17 Drawing Sheets

PORTABLE CONFINED SPACE VENTILATOR

CROSS-REFERENCE TO RELATED APPLICATION

This application relates to the same subject matter as provisional patent application Ser. No. 61/799,387, filed by the same applicant on Mar. 15, 2013. This application claims the Mar. 15, 2013 filing date as to the common subject matter.

BACKGROUND OF THE INVENTION

1. Field of Invention

The present invention relates to heating, ventilation, and air conditioning systems. It is a device designed to ventilate, heat, and/or cool a confined space, such as the wings, fuselage, and/or tail of an aircraft during the manufacturing of said aircraft.

2. Background of Invention

There are numerous instances in the manufacturing industry where workers building the machine are required to perform their work in enclosed spaces with limited or no natural ventilation. For example, a worker assembling an airplane may need to perform work inside the wing of the aircraft, the tail of the aircraft, or the fuselage, all of which are enclosed areas with limited or no natural ventilation. The lack of ventilation can be hazardous to the workers in these areas.

Additionally, there are numerous instances in the manufacturing industry where precise temperature control in an enclosed space is required. For example, many modern commercial airlines are constructed using composite materials. These composite materials require precise temperature control during the manufacture of the aircraft. Lack of precise temperature control can adversely affect the finished properties of the composite materials.

It may also be desirable to provide both ventilation and precise temperature control at the same time. For instance, a worker working on the interior of a modern airplane wing may be applying chemicals used in the composite structure of the airplane. In such a situation it is desirable to provide both ventilation for the worker and precise temperature control so that the chemicals being used are applied appropriately to the composite construction.

Therefore, there exists a need for a device capable of providing ventilation to an enclosed space that is also capable of providing precise temperature control and variation.

The invention allows users to provide high flow ventilation to enclosed spaces, and to provide precise temperature control to a specific area, in a portable unit.

SUMMARY OF THE INVENTION

In accordance with one aspect of the invention, a device for providing ventilation, heating, and/or cooling is provided. The invention may operate as a portable confined space ventilator.

In accordance with another aspect of the invention, the device is portable, sitting on wheels or casters with an attached tow bar for moving the device freely. Additionally, the invention can be built with attachment points for forklifts, cranes, or other devices.

The invention provides for a high powered fan and blower capable of supplying up to 9,000 cubic feet per minute of airflow with 9 inches of static pressure. The air supplied by the device is variable through the use of a control interface. An air filter may be provided and incorporated into the device to filter the output air.

In accordance with another aspect of the invention, a plenum is provided that includes either four individual ducts or one large adjustable duct, allowing the operator of the device to control up to four individual air outlets from a single device.

The invention may have a 'cooling' mode that provides for 8 or more tons of air conditioning with a temperature range of 0 to 120 degrees Fahrenheit.

The invention may have a 'heat' mode that provides for 28 kilowatts of heat, or more.

The invention is built so that it can operate under outdoor conditions, including rain, snow, sand, and extreme heat, as well as continuous "24/7" operation. The invention is capable of being used in temperatures from 0 to 120 degrees Fahrenheit.

DETAILED DESCRIPTION OF THE INVENTION

A device for providing ventilation, heating, and cooling is disclosed herein and as shown in FIGS. 1 through 26.

Figure 1:
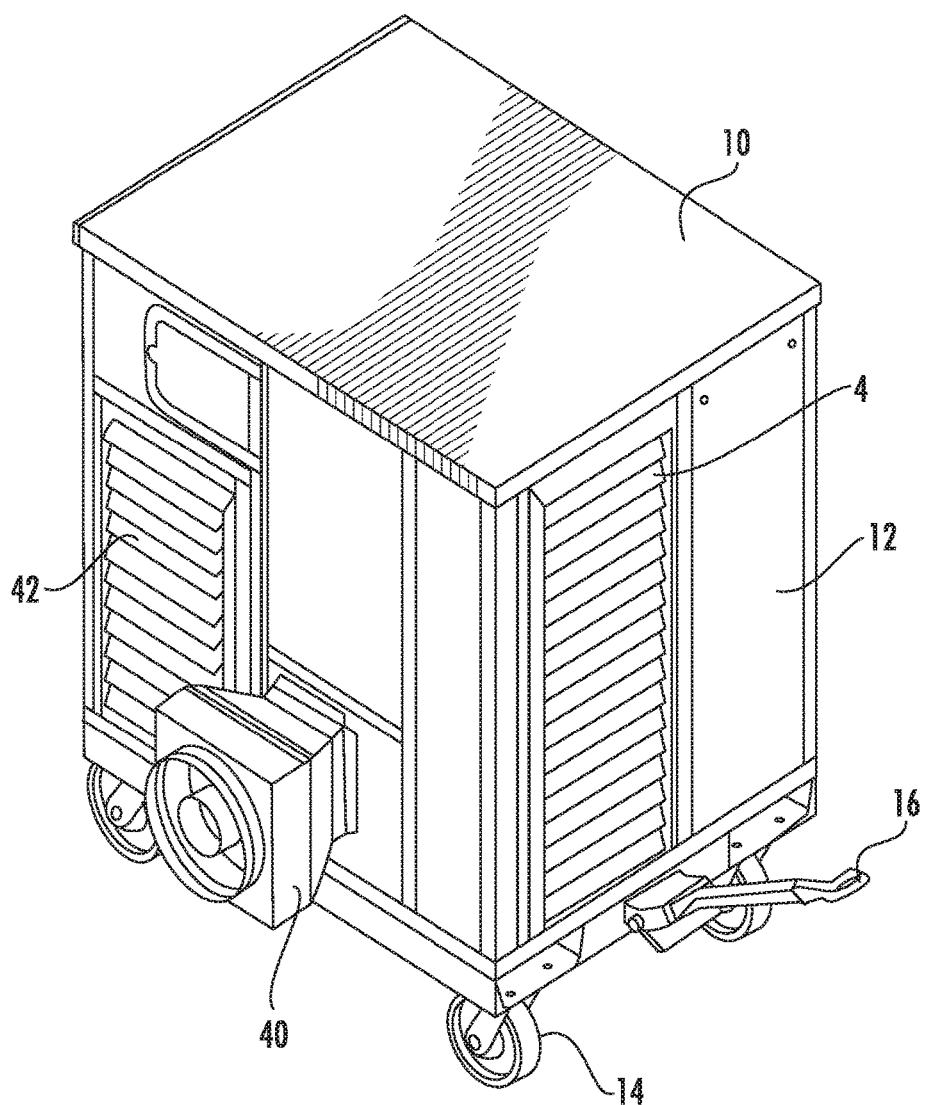
FIG. 1 is a perspective view of the device.
Figure 2:
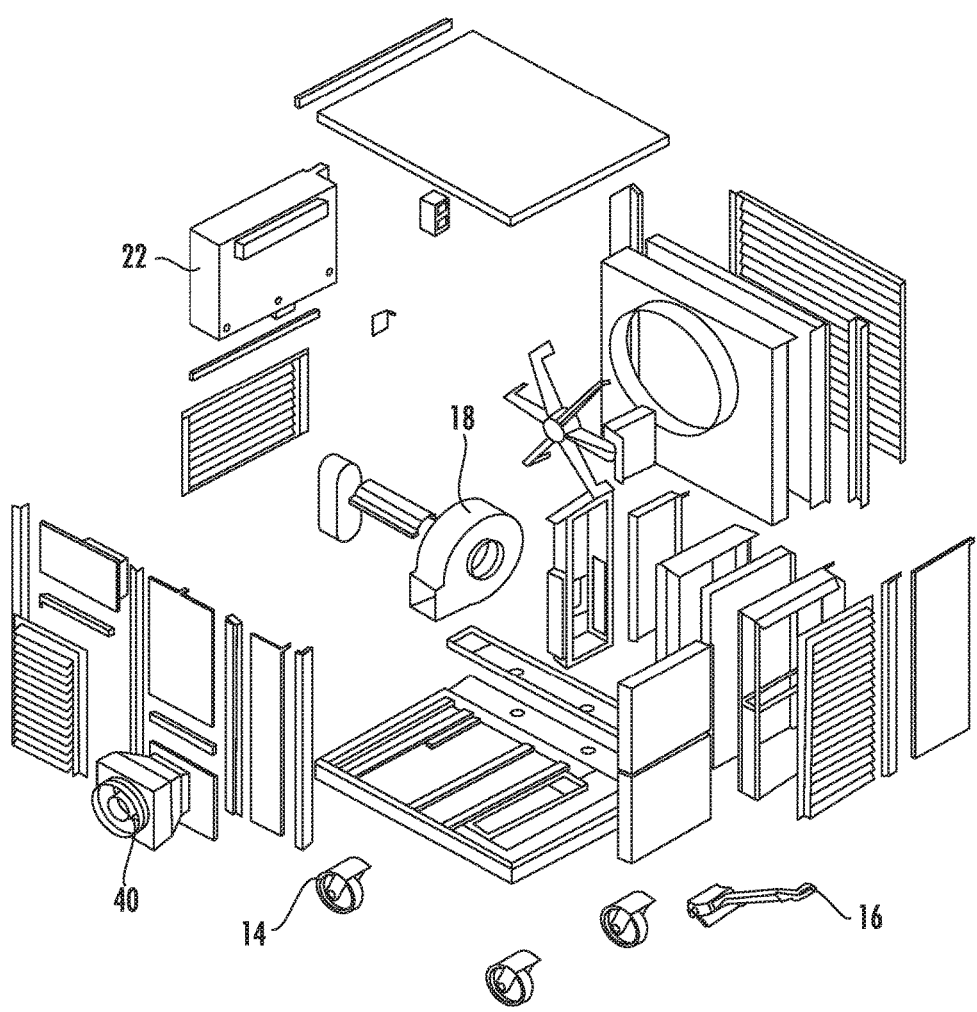
FIG. 2 is an exploded perspective view of the chassis of one embodiment of the device.

The device is shown generally in FIGS. 1 and 2 at 10. The chassis 12 may be made portable by attaching wheels 14, casters, skids or similar features to the bottom surface of the chassis 12. Additionally, lifting points for a crane or other lifting device may be provided on the top of the chassis 12. Further additionally, engagement points for a forklift may be provided on the bottom of the chassis 12. A pull handle 16 or tow bar may also be provided on the chassis 12.

Figure 3:
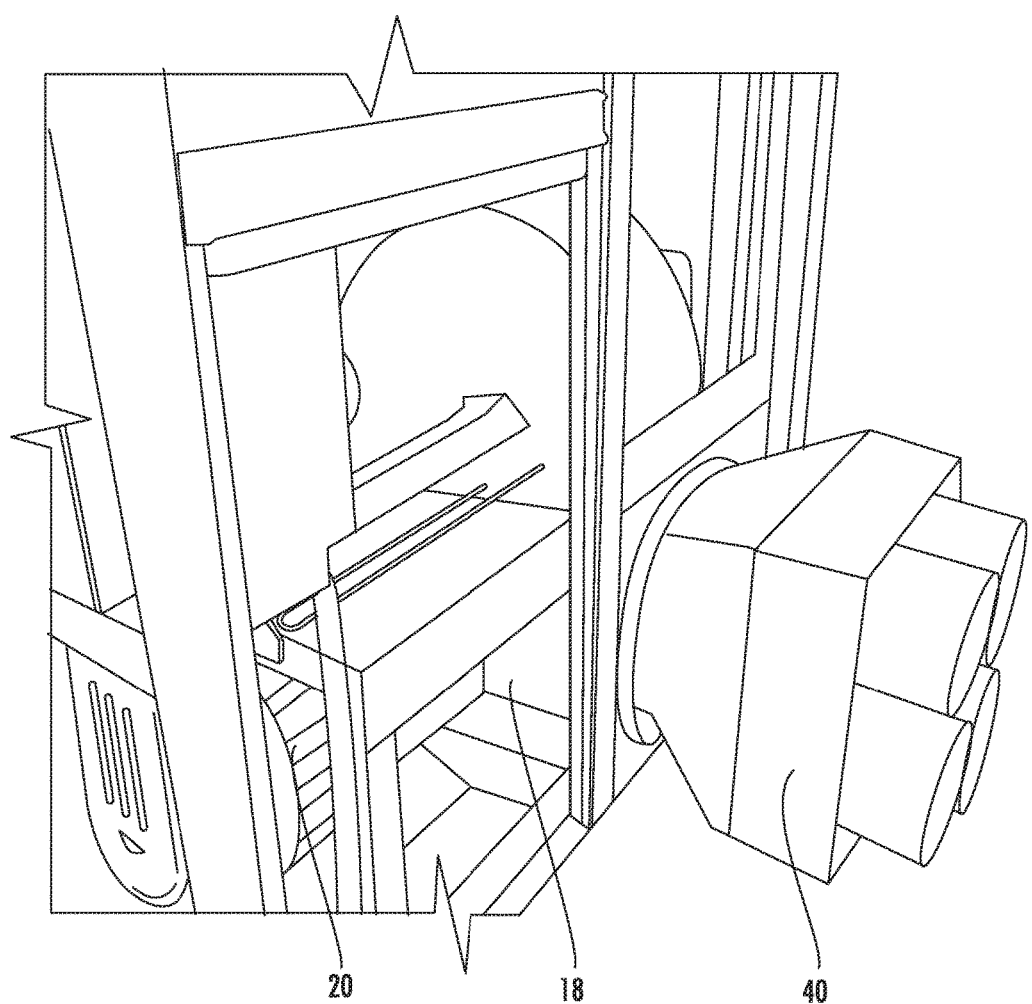
FIG. 3 is a detail perspective view of one side of one embodiment of the device.
Figure 4:
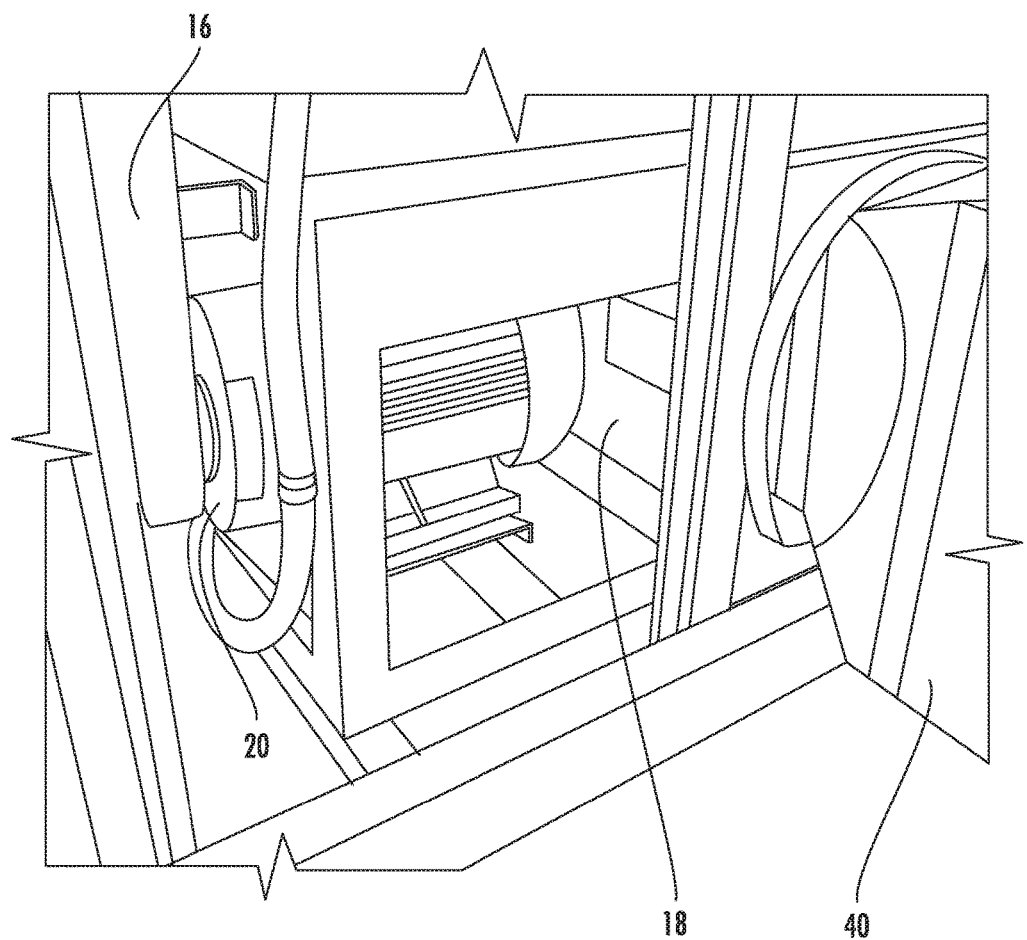
FIG. 4 is a detail perspective view of the interior of one embodiment of the device.
Figure 5:
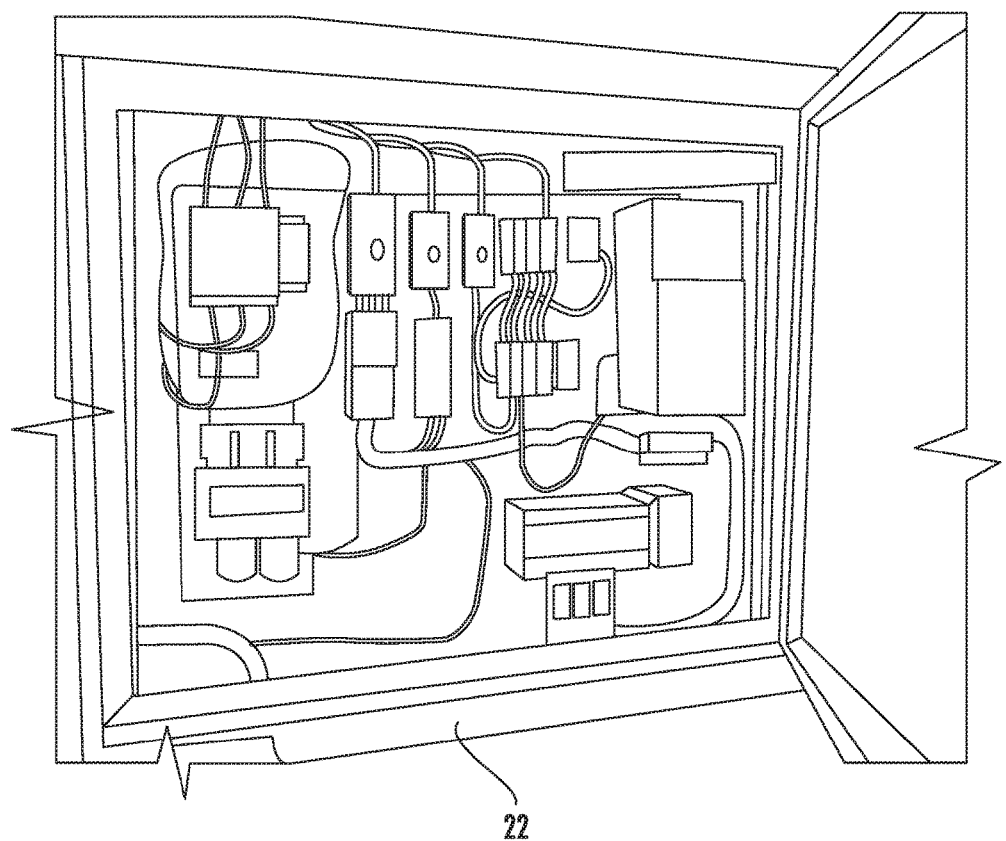
FIG. 5 is a plan view of the electronics box of one embodiment of the device.
Figure 6:
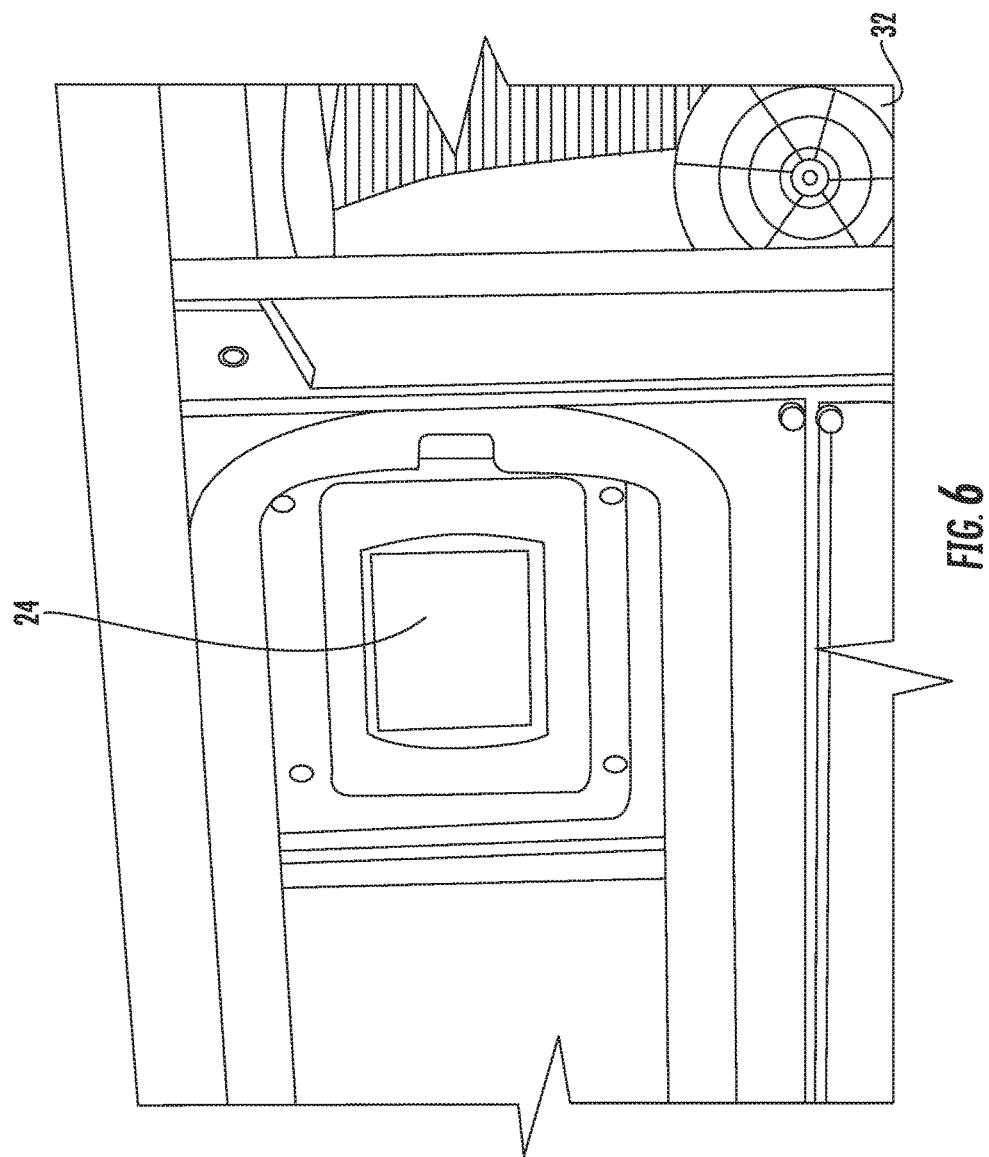
FIG. 6 is a plan view of the control panel of one embodiment of the device.
Figure 7:
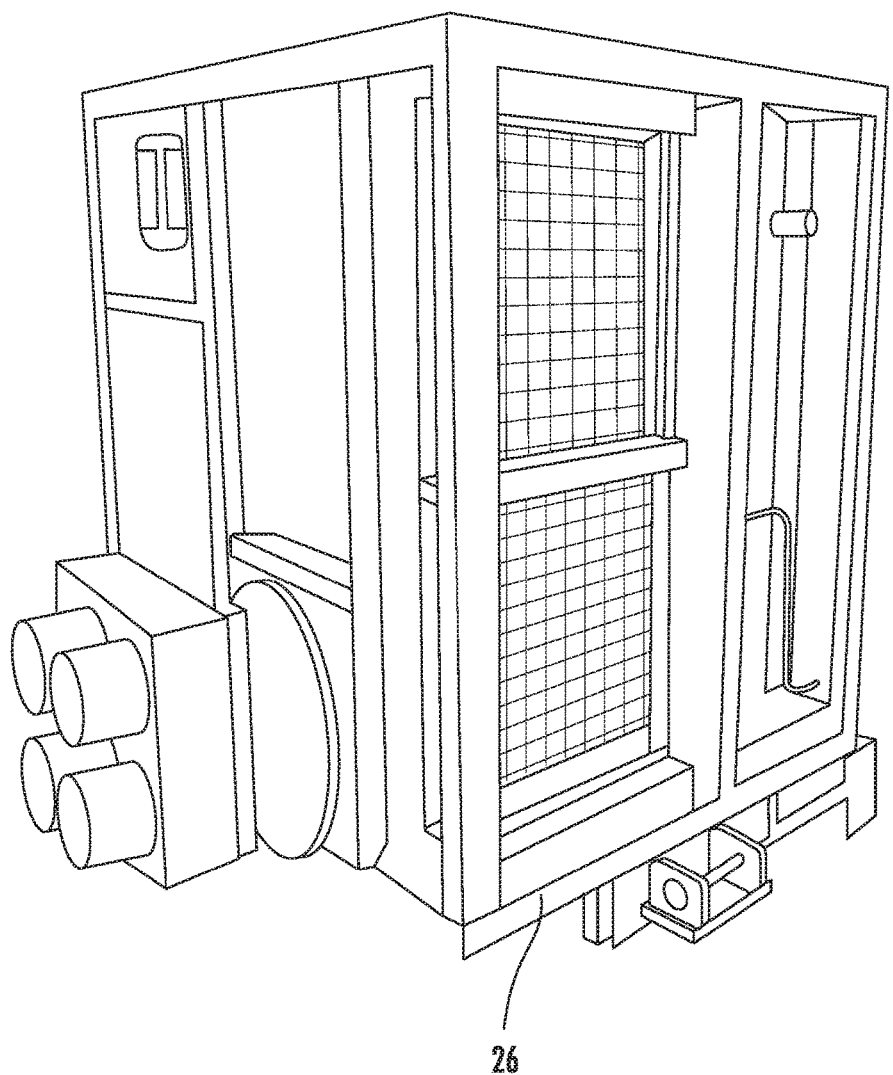
FIG. 7 is a perspective view of one embodiment of the device.
Figure 8:
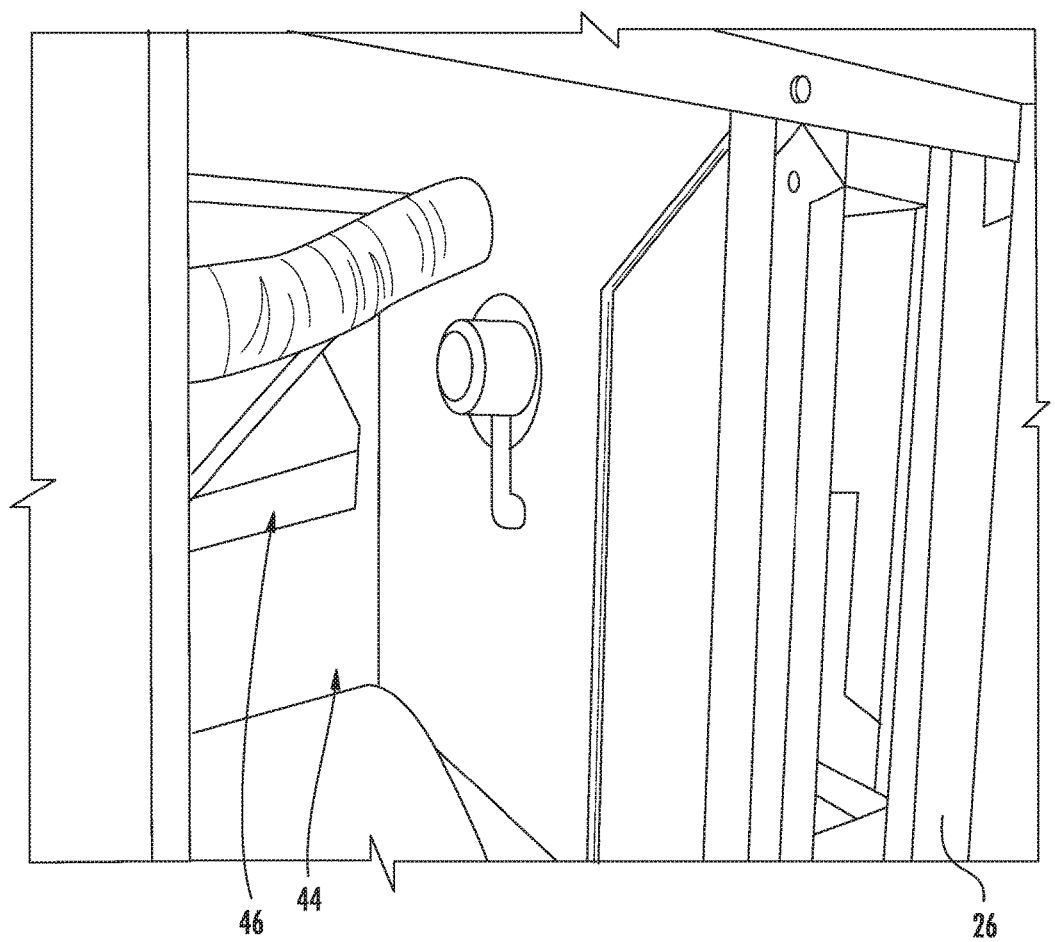
FIG. 8 is a detail perspective view of the interior of one embodiment of the device.

As shown in FIGS. 3 and 4, the device further comprises a high output blower 18 located inside the chassis 12. The blower 18 is controlled by a motor 20 and together they are controlled by an electronics panel in an electronics box 22, as shown in FIGS. 2 and 5. The blower 18 may be one such as the Model 3C106 by Dayton. The motor for the blower may be one such as the 170159.60 made by Leeson. The electronics within the electronics panel may be controlled by user inputs into a control panel 24 shown in FIG. 6, accessible from the outside of the chassis 10. The control panel allows the user of the device to control the function and operation of the device. The control panel is set into the side of the chassis and contains a touch panel or other device for displaying information and accepting user input. A control panel cover may be provided to protect the control panel from outside elements. A control panel cover may provide water protection to the control panel so that the unit may be used outdoors and exposed to natural elements.

The control panel allows the user to operate the device. In one embodiment of the device, four modes of operation are available: cool mode, heat mode, cure mode, and fan only mode. Additionally, manual user and maintenance modes may be provided. The control panel also gives the user access to adjust the settings of the device, check the status of the device, and to set various user-defined alarms to alert the user to various operating conditions of the device. The control panel also provides the user alerts for the drain pump and air filter of the device. These alerts inform the user of issues such as the presence of a problem with the drain pump, that the drain pans need to be emptied, or that one or more air filters need to be replaced.

Figure 9:
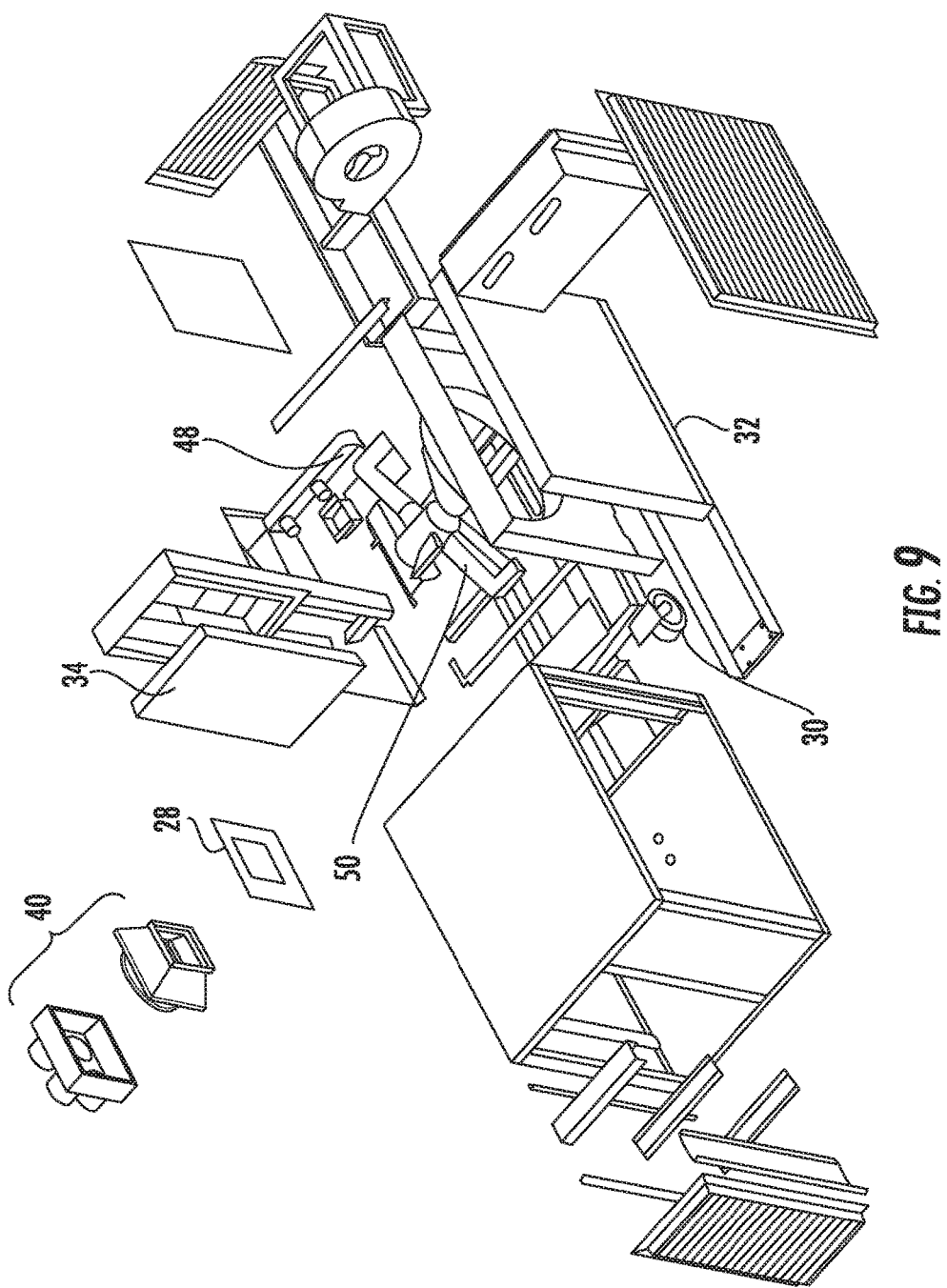
FIG. 9 is an exploded perspective view of one embodiment of the device.
Figure 10:
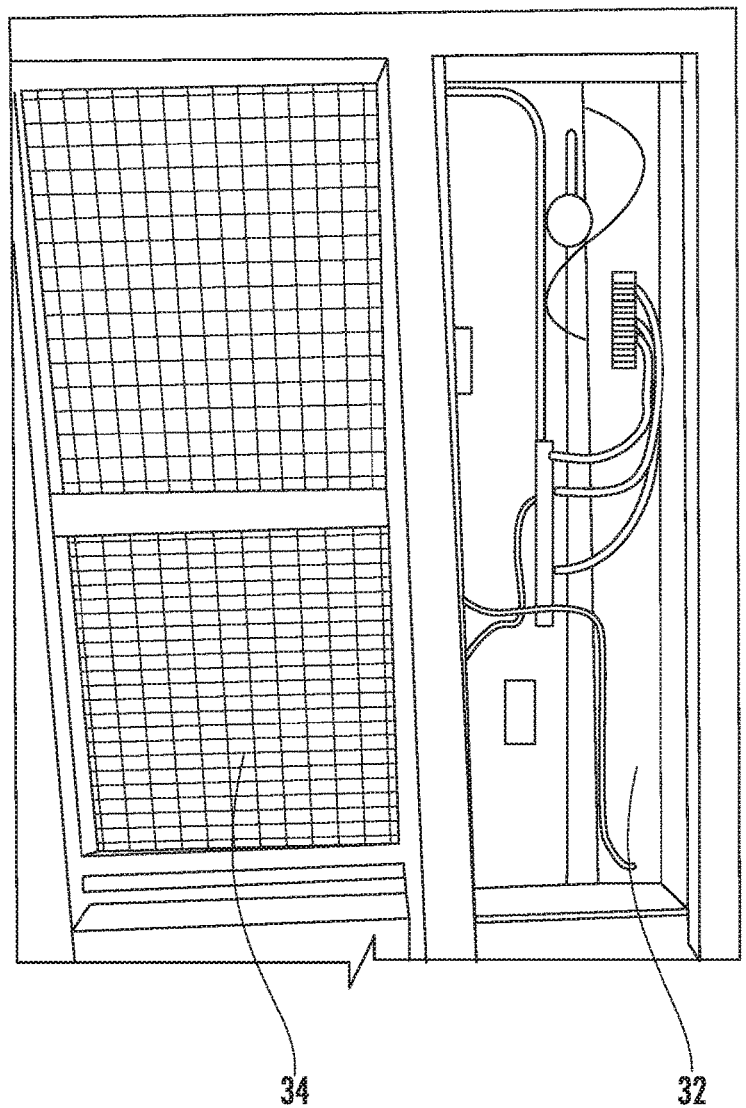
FIG. 10 is a side view of the interior of one embodiment of the device.
Figure 11:
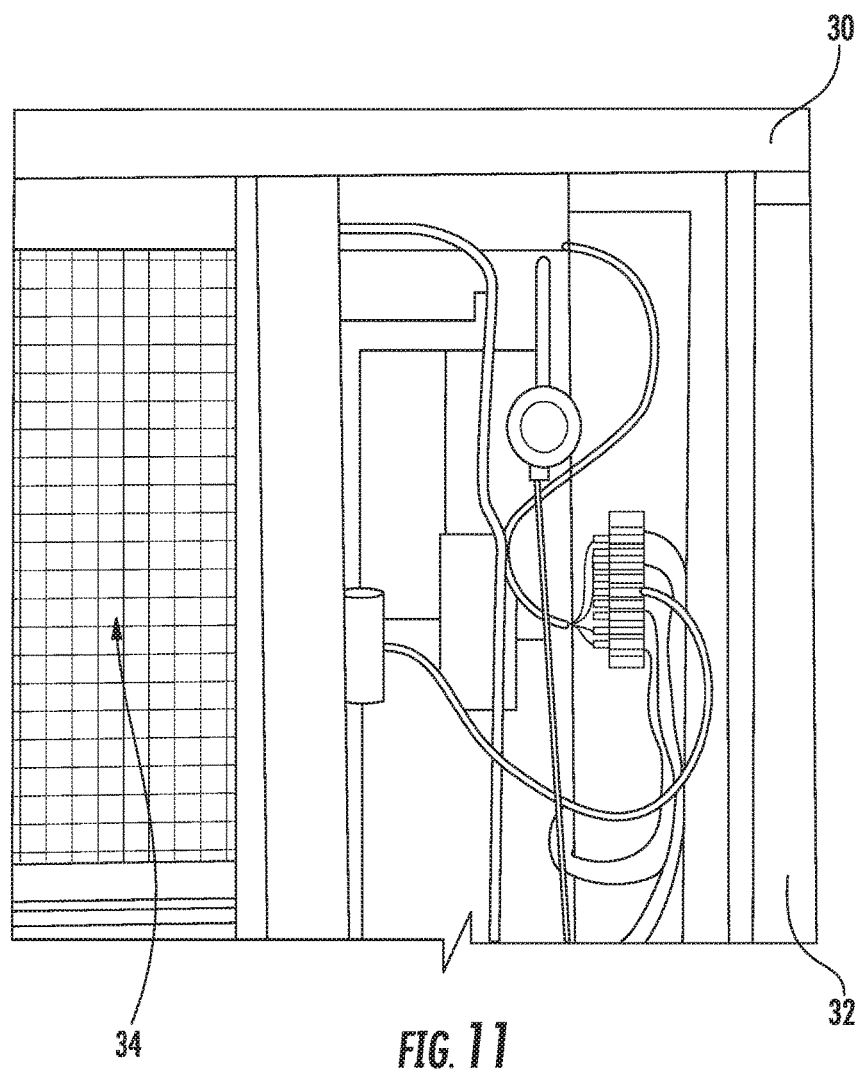
FIG. 11 is a detail perspective view of the interior of one embodiment of the device.
Figure 12:
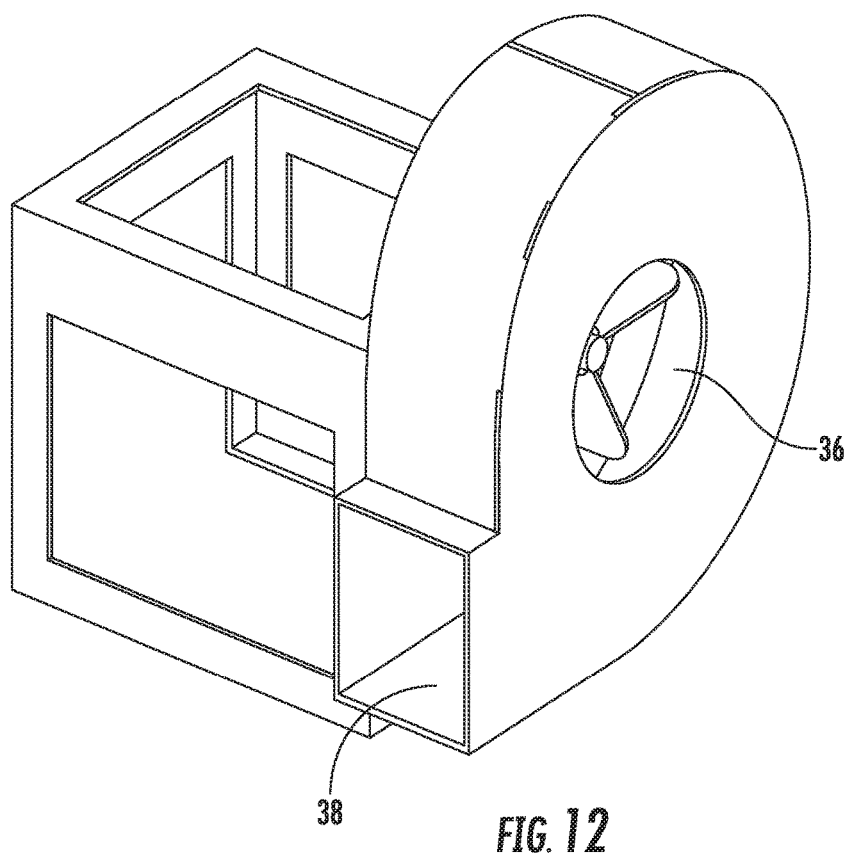
FIG. 12 is a perspective view of a blower of one embodiment of the device.

The chassis 12 includes an evaporator coil air intake opening 26 as shown in Figured 7 and 8. In addition, as shown in FIGS. 9-11, the chassis 12 includes a treated air discharge opening 28 and a condenser coil air flow opening 30. The device 10 further includes a condenser coil unit 32, and an evaporator coil unit 34. The blower 18 has an air intake opening 36 shown in FIG. 12 and an air discharge opening 38 in fluid communication with the treated air discharge opening 28 on the chassis 12. The air intake opening 36 of the blower 18 is in fluid communication with the evaporator coil unit 34. Either the condenser coil unit or the evaporator coil unit, or both, may comprise a plurality of spaced apart arrays of coils. In one embodiment, the coils are made of copper tubing on an aluminum frame.

When activated, the blower 18 may draw air from outside the device 10 over the evaporator coil unit 34. The chassis 12 may be formed so that an air filter may be placed within the chassis 12 over the evaporator coil unit 34. In one example the coils for the evaporator and/or the condenser may have a ⅜ inch diameter with a wall thickness of about 0.016 inches. Air may also be drawn through other air inflow openings formed into the chassis 12. The air may then be passed through a heat exchanger or heating elements to change the temperature of the output air, as desired. The heat exchanger and heating elements may be switched off at the control panel 24. The blower 18 then forces the air out of the treated air discharge opening 24.

Figure 13:
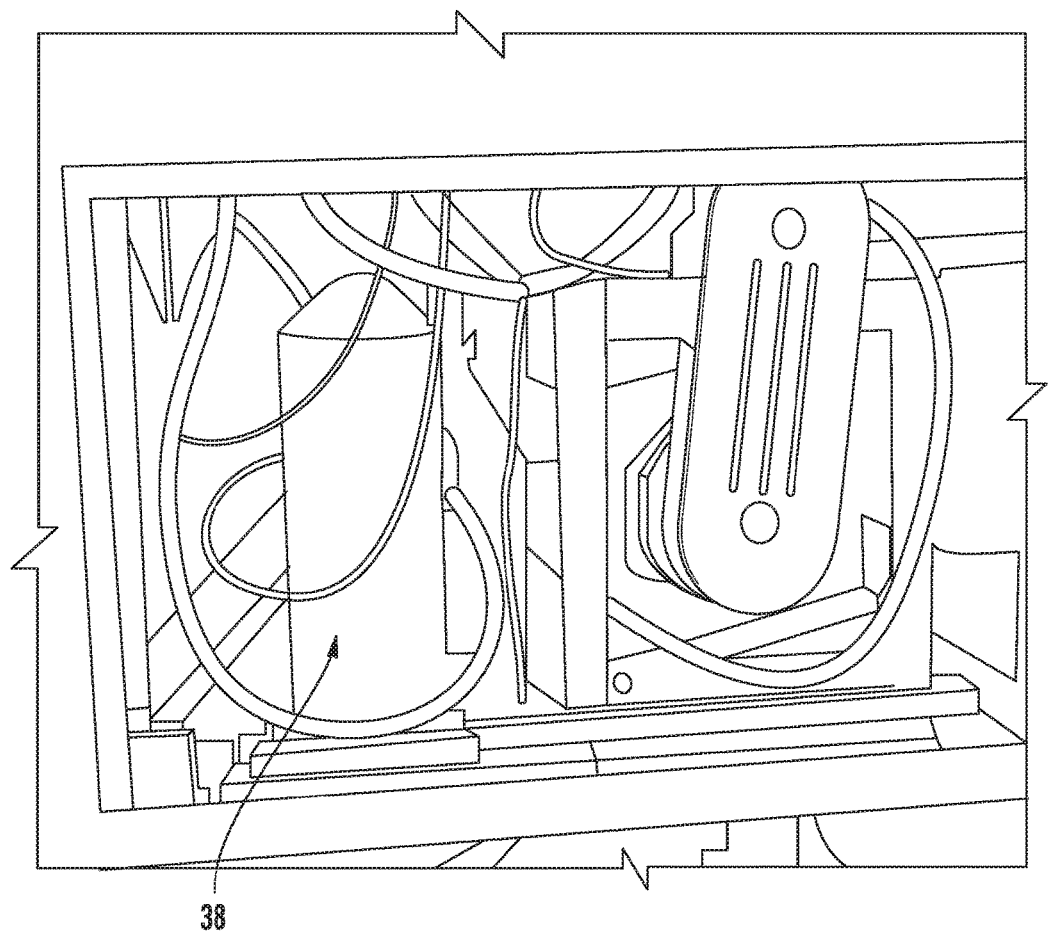
FIG. 13 is a detail side view of one embodiment of the device.
Figure 14:
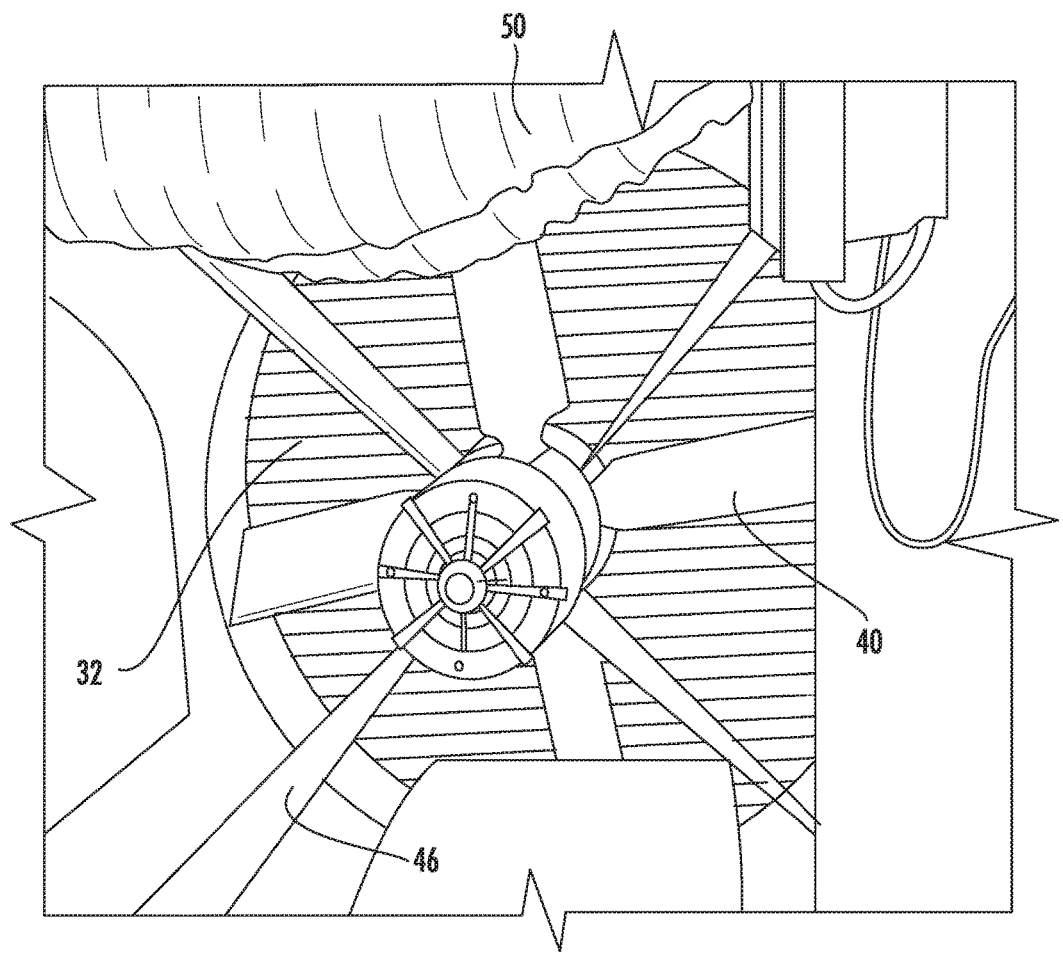
FIG. 14 is an interior view of one embodiment of the device.
Figure 15:
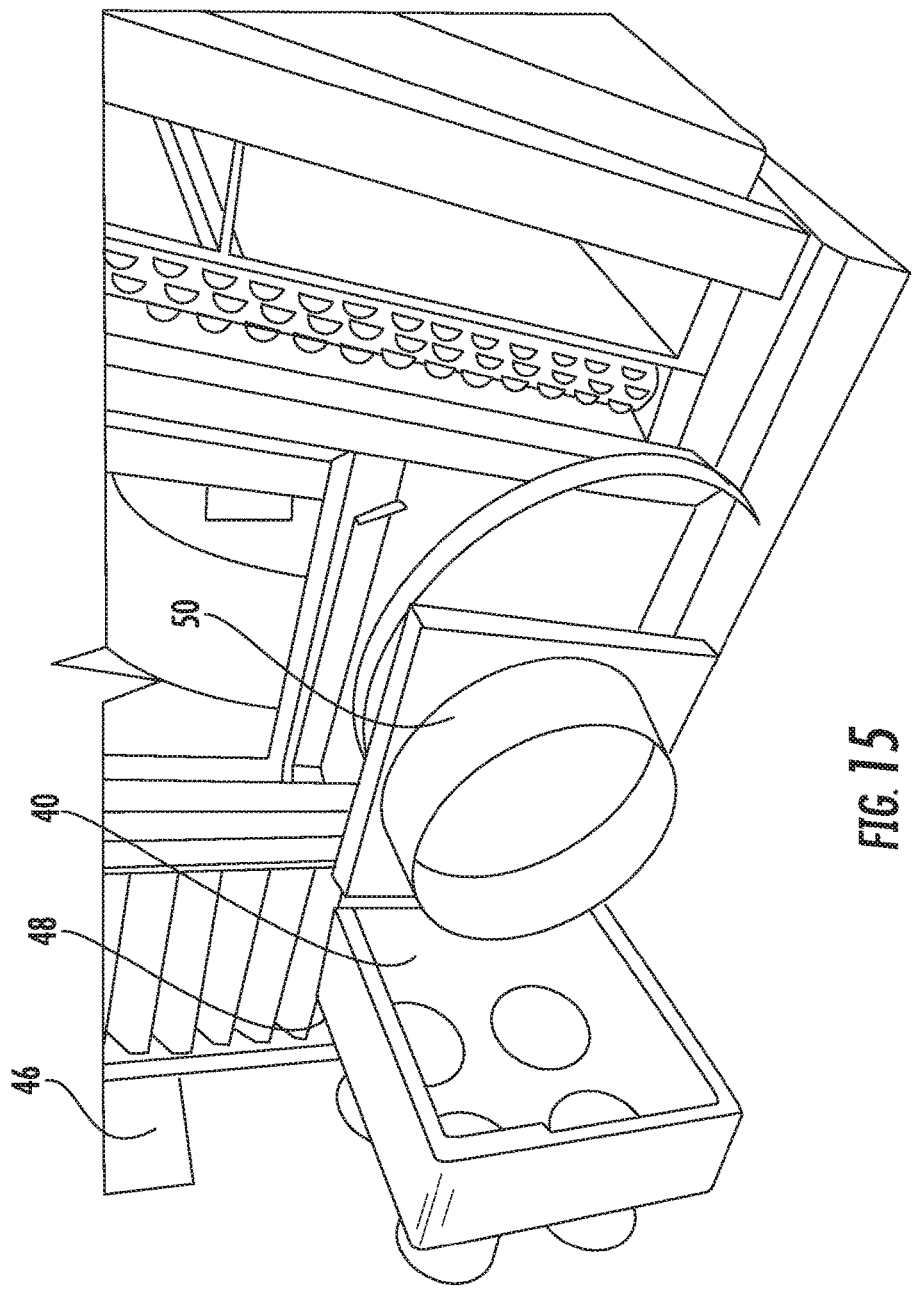
FIG. 15 is a perspective view of the treated air passage of the device.

The device 10 includes a closed loop system filled with a refrigerant as known in the art. As shown in FIGS. 13 and 14, the system includes a compressor 38 also known in the art. The refrigerant circulates between the compressor 38, a condenser such as a condenser coil unit 32, and may circulate within a heat exchanger. The compressor 38 may be located at various locations within the chassis 12. A heat exchanger may be located between the blower 18 and a treated air discharge passage 40 (or plenum) such that air from the blower 18 is passed over the heat exchanger before being forced through the passage 40.

The condenser coil unit 32 may be a normal air conditioning condenser of a type known to those of ordinary skill in the art. Alternatively, the condenser may be comprised of pipe coils made from a material that conducts heat. Each of the coils may be bent to form a winding pattern in an array similar to that of a traditional air conditioning condenser known to those of ordinary skill in the art. Arrays may then be formed into spaced apart arrays of condenser coils. In this form air forced over the condenser coil unit 32 passes first over one pipe and then over the other pipe. The pipes are then connected to each other such that the refrigerant in the closed loop system formed by the compressor 38, condenser, and heat exchanger, flows through a plurality of the arrays. Heat sink fins, made of conductive materials, may be attached to the conjoined arrays. This arrangement doubles the surface area of the coils forming the arrays. The condenser coil unit may be attached to one side of the chassis 12 with a mounting bracket. The condenser mounting bracket may be attached to the chassis 12 and a condenser airflow opening 26 is provided in the chassis 12 at the location of the condenser mounting bracket to allow air to be exhausted from inside the device 10, over the condenser coil unit 32, and out of the device 10 through the condenser coil air flow opening 30. The chassis 12 may be formed so that an air filter may be placed within the chassis 12 over the condenser coil unit 34. The condenser coil air flow opening 30 and the evaporator coil unit opening 26 may be covered by a louver 42 or other protective device.

The device further comprises a condenser fan 44 located within the chassis 12. The condenser fan 44 is attached to a compressor fan mount 46. The condenser fan mount 46 may be attached to a condenser fan mounting bracket 48 on the side of the chassis 12. The condenser fan 44 can be of varying design and type sufficient to provide adequate air flow to carry heat away from the condenser coil unit 32, which can be easily determined by one of ordinary skill in the art. The fan mount 46 may comprise two or more fan mount arms 50. The fan mount arms 50 may be attached on one end to the condenser mounting bracket and on the other end to the condenser fan 40, either directly or by the use of a collar or other retaining device. The condenser fan mount 46 may be designed to reduce vibrations and noise during the operation of the device.

The device may further comprise heating elements located in the same general location as the heat exchanger, between the blower 18 and the treated air discharge opening 28. The heating elements are controlled by the electronics, which is in turn controlled by the user inputs into the control panel 24. The heating elements may heat the air pushed from the blower 18 through the treated air discharge opening 24 in order to obtain a user's desired treated air temperature.

The adjustable treated air passage 40 may comprise a plurality of discharge holes 46. In one embodiment, the passage 40 is formed to the outer surface of the chassis 12 and is in fluid connection with the blower 18 located inside the chassis 12. The treated air discharge opening 24 may further comprise an adjustable treated air passage 40. For example, the passage 40 may adjust to comprise a plurality of discharge holes. In one embodiment, the passage 40 may comprise an outer element 48 and an inner element 50. In one example, the inner element 50 may contain a single outlet hole of large diameter through which air from the blower is forced. The outer element may include a plurality of discharge holes and fit over the inner plenum element as shown in FIG. 10.

Figure 16:
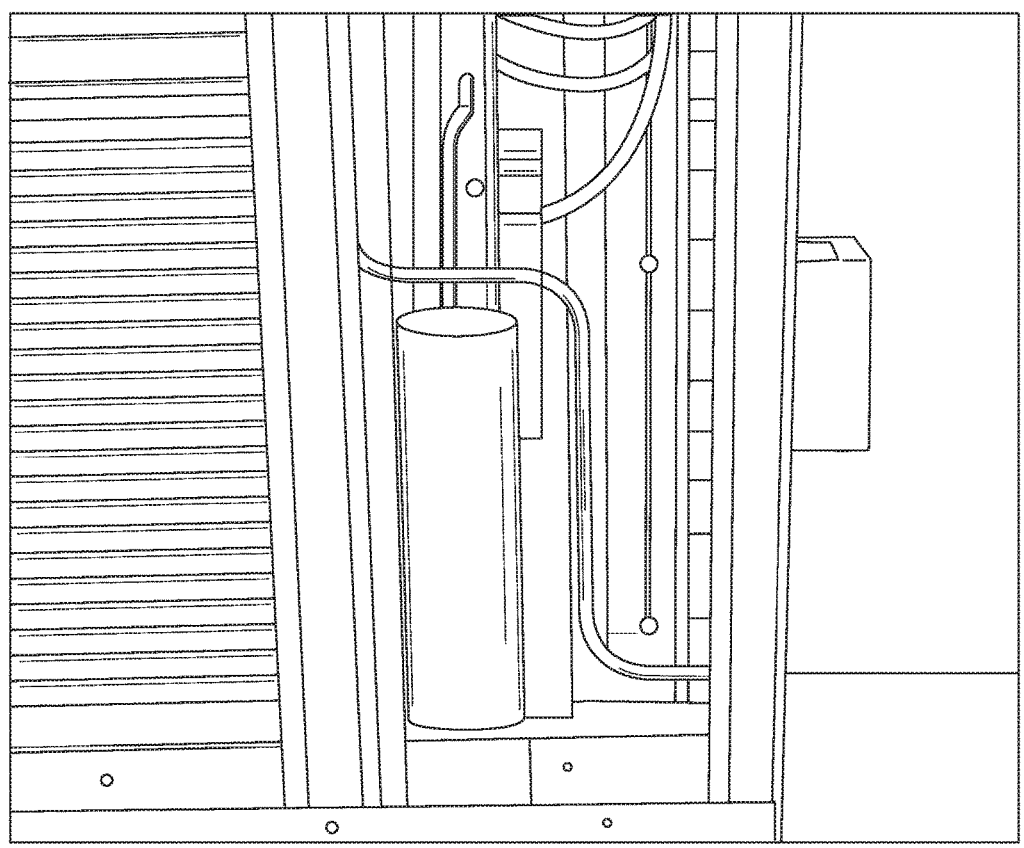
FIG. 16 is a side view of the refrigeration system of one embodiment of the device.
Figure 17:
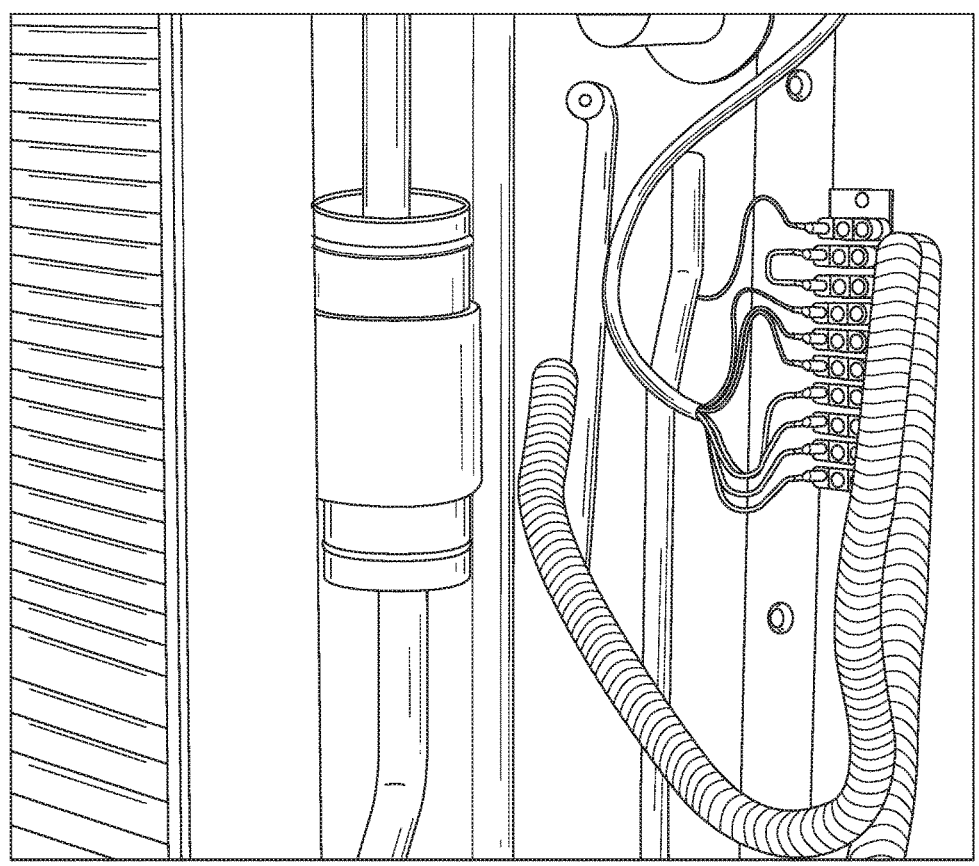
FIG. 17 is a detailed view of the refrigeration system of one embodiment of the device.

Additional detail views of the invention are provided in FIGS. 16 and 17.

The outer element may be attached to the inner element by an adjustment mechanism such as a hinge and latch mechanism such that the outer element may be alternatively securely attached to the inner element or may be released and swung away from the inner element exposing the inner element.

The adjustable treated air passage allows the user of the device to alter the airflow output of the device. The user can close and secure the outer plenum element and attach a single, larger diameter hose to direct the air output from the device to a single location. Alternatively, the user can attach one or more independent air hoses to one or more of the outer element holes. In addition, one or more of the plurality of holes not in use by the user may be blocked using an attachable blocking plate. Thus, a user may direct the air output of the device to multiple, independent locations. This provides a substantial benefit for the user.

The device may also include an automatic drainage system. The drainage system may allow condensate to exit the chassis to a condensate pan below the chassis using a pump system, either inside of or outside of the chassis. The pump system may be disabled or, alternatively, replaced with a manual drainage system. The condensate pan may also be used to store extra hoses or other parts.

The device may also further comprise a condenser coil air filter frame located between the condenser coils and an outside surface of the chassis, and an evaporator coil air filter frame located between the evaporator coils and the outside surface of the chassis.

In addition, a plurality of access panels may be provided on the chassis allowing access to the interior of the chassis. The panels can be placed at various locations on the exterior of the chassis and can be attached to the chassis with a variety of attachment devices. The preferred embodiment uses cam locks to secure the access panel covers to the device chassis.

One or more additional openings in the sides of the chassis may provide air inflow for the device. The openings may be protected by a grille or louver 42 designed to prevent the device from ingesting foreign object debris or moisture from the surrounding environment. The grille or louver may be of varying design. The preferred embodiment is a louver that is constructed of a single piece of material that has had a series of cuts made through the metal allowing the individual fins of the louver to be bent to the desired angle. The cuts can be generally "U"-shaped with a base nearly the width of the louver and the sides of varying lengths from one inch or more. Once the individual veins of the louver are bent to the desired angle, the veins may be held in place by attachment, via welding or otherwise, to rails on either side of the louver. This construction of the louver simplifies construction and reduces the overall weight of the device.

In one embodiment of the device, four modes of operation are available: cool mode, heat mode, cure mode, and fan only mode. Additionally, manual user and maintenance modes may be provided.

Cool mode allows the user to set a temperature, below the ambient air temperature surrounding the device, for the air output by the device.

Heat mode allows the user to set a temperature, above the ambient air temperature surrounding the device, for the air output by the device.

Cure mode allows the user to input a pre-defined air flow and temperature program that will cause the device to output the required amount of air at the desired temperature for the desired amount of time to achieve a number of goals, such as controlling the air temperature around composite materials that are curing, such as carbon fiber and epoxy resin.

Fan only mode allows the user to direct the device to output a certain amount of air flow without any heating or cooling of the output air.

In all operation modes—cool mode, heat mode, cure mode, and fan only mode—the user can specify the desired temperature and can select automatic fan control, manual fan control, and stop. In automatic fan mode the device selects the fan speed (as a percentage of the maximum possible fan speed) at which to operate. In manual fan control mode the user selects the fan speed (as a percentage of the maximum possible fan speed) that the user desires. Stop mode stops the device from operating and places the device into standby mode.

What is claimed is:

1. A modular air conditioning unit, comprising:
   a chassis having an outside surface, comprising
      an evaporator coil air intake opening;
      a treated air discharge opening; and
      a condenser coil air flow opening; and
   an air conditioning system located within the chassis, comprising
      a condenser coil unit,
      an evaporator coil unit, and
      a blower, including
         an air intake opening in fluid communication with the evaporator coil unit, and
         an air discharge opening in fluid communication with the treated air discharge opening, and
   at least one heating element disposed between the blower and the treated air discharge opening, and
   a control display located on the outside surface of the chassis, wherein the control display is configured to permit an operator to select a mode of operation comprising a cool mode, a heat mode, a cure mode and a fan-only mode, wherein the cure mode is associated with at least one cure profile comprising a pre-defined air flow, a pre-defined temperature and a pre-defined time.

2. The modular air conditioning unit of claim 1, further comprising a plenum located between the evaporator coil unit and the air intake opening of the blower.

3. The modular air conditioning unit of claim 1, wherein the condenser coil unit comprises a plurality of spaced apart condenser coil arrays.

4. The modular air conditioning unit of claim 1, wherein the evaporator coil unit comprises a plurality of spaced apart evaporator coil arrays.

5. The modular air conditioning unit of claim 1, wherein the chassis further comprises:
   a blower motor frame, and
   a blower motor attached to the motor frame in mechanical connection with the blower.

6. The modular air conditioning unit of claim 1, wherein the treated air discharge opening further comprises an adjustable treated air passage, comprising a plurality of discharge holes.

7. The modular air conditioning unit of claim 1, further comprising:
   a condenser fan mount located within the chassis; and
   a condenser fan attached to the condenser fan mount in fluid communication with the condenser coil unit.

8. The modular air conditioning unit of claim 1, further comprising a condenser coil air filter frame located between the condenser coils and an outside surface of the chassis, and an evaporator coil air filter frame located between the evaporator coils and the outside surface of the chassis.

9. The modular air conditioning unit of claim 1, further comprising at least one of wheels, casters, lifting points, forklift engagement points, handles, a tow bar and skids located on the outside surface of the chassis.

10. The modular air conditioning unit of claim 1, wherein the control display is connected to controls of at least one of treated air discharge temperature, pressure, humidity, and timed operation.

11. A method of supplying treated air into a confined space using the modular air conditioning unit of claim 1, the method comprising:
 positioning the modular air conditioning unit proximate to the confined space;
 extending a duct between the treated air discharge opening and the confined space;
 selecting a desired mode of operation of the modular air conditioning unit; and
 supplying treated air from the modular air conditioning unit into the confined space through the duct.

12. The method of claim 11 further comprising:
 extending a second duct between the treated air discharge opening and a second confined space; and
 supplying treated air from the modular air conditioning unit into the second confined space through the second duct.

13. The modular air conditioning unit of claim 1 further comprising at least one filter configured to filter output air before the output air exits the treated air discharge opening.

14. The modular air conditioning unit of claim 1 wherein the at least one heating element is capable of providing at least 28 kilowatts of heat.

15. The modular air conditioning unit of claim 6 further comprising at least one attachable blocking plate configured to block one of the plurality of discharge holes in the adjustable treated air passage.

16. The modular air conditioning unit of claim 1 wherein the unit is configured to be capable of operating in a range of temperatures from about 0 degrees Fahrenheit to about 120 degrees Fahrenheit.

17. The modular air conditioning unit of claim 1 further comprising an automatic drainage system for automatically removing condensate from the chassis.

18. The method of claim 11, wherein the confined space comprises an airplane wing, an airplane fuselage, and an airplane tail.

19. The modular air conditioning unit of claim 1, wherein the blower is capable of supplying at least 9,000 cubic feet per minute of air flow with 9 inches of static pressure.

20. The modular air conditioning unit of claim 1, wherein the at least one cure profile is associated with a type of material.

\* \* \* \* \*